US 6,665,516 B2

(12) United States Patent
Morgenweck et al.

(10) Patent No.: US 6,665,516 B2
(45) Date of Patent: Dec. 16, 2003

(54) FIXATION DEVICE FOR FIXATION OF TONER MATERIAL

(75) Inventors: Frank-Michael Morgenweck, Molfsee (DE); Domingo Rohde, Kiel (DE)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 10/015,976

(22) Filed: Dec. 10, 2001

(65) Prior Publication Data

US 2002/0106226 A1 Aug. 8, 2002

(30) Foreign Application Priority Data

Dec. 22, 2000 (DE) .......................................... 100 64 561

(51) Int. Cl.⁷ .............................................. G03G 15/20
(52) U.S. Cl. ....................................... 399/336; 219/216
(58) Field of Search ................................ 399/336, 335, 399/320; 219/216, 678

(56) References Cited

U.S. PATENT DOCUMENTS

| | | | | |
|---|---|---|---|---|
| 3,898,424 A | * | 8/1975 | Thettu ........................ | 219/216 |
| 3,901,591 A | * | 8/1975 | Mitsumasu .................. | 219/216 |
| 3,953,709 A | * | 4/1976 | Elter ........................... | 219/216 |
| 4,355,225 A | * | 10/1982 | Marsh ......................... | 219/216 |
| 4,399,341 A | * | 8/1983 | Yasuoka ...................... | 399/336 |
| 4,482,239 A | * | 11/1984 | Hosono et al. .............. | 399/336 |
| 4,511,778 A | * | 4/1985 | Takahashi et al. ........... | 399/336 |
| 4,542,980 A | * | 9/1985 | Tajima ........................ | 399/336 |
| 4,668,073 A | * | 5/1987 | Hatabe et al. ............... | 399/336 |
| 4,894,679 A | * | 1/1990 | Rachwal et al. | |
| 4,897,691 A | * | 1/1990 | Dyer et al. .................. | 399/336 |
| 5,784,679 A | * | 7/1998 | Schlueter et al. ........... | 399/335 |
| 5,805,969 A | * | 9/1998 | Elsermans et al. | |
| 6,085,060 A | * | 7/2000 | Goldmann et al. ......... | 399/335 |
| 6,287,024 B1 | * | 9/2001 | Furukawa .................... | 219/216 |
| 6,449,458 B1 | * | 9/2002 | Lang et al. .................. | 399/336 |

FOREIGN PATENT DOCUMENTS

| | | |
|---|---|---|
| DE | 26 45 765 B1 | 4/1978 |
| DE | 29 35 471 A1 | 3/1981 |
| DE | 42 08 165 A1 | 10/1992 |
| DE | 198 27 211 C1 | 1/2000 |
| JP | 6-155777 * | 6/1994 |
| WO | WO 9738863 A1 * | 10/1997 |

OTHER PUBLICATIONS

55108677 A: JP Patent Abstracts of Japan, Aug. 21, 1980.
57124770 A: JP Patent Abstracts of Japan, Aug. 3, 1982.
57150867 A: JP Patent Abstracts of Japan, Sep. 17, 1982.
07013449 A: JP Patent Abstracts of Japan, Jan. 17, 1995.

* cited by examiner

Primary Examiner—Susan S.Y. Lee
(74) Attorney, Agent, or Firm—Lawrence P. Kessler

(57) ABSTRACT

A fixation device for fixation of toner material on a printing stock for an electrophotographic printer with a radiation wavelength essentially in the ultraviolet range for thermal melting of the toner material, and the stock, as carrier of the toner material, is heatable by a device essentially during the exposure process.

12 Claims, 2 Drawing Sheets

FIXATION DEVICE FOR FIXATION OF TONER MATERIAL

FIELD OF THE INVENTION

The invention concerns a fixation device, as well as a method for fixation of toner material.

BACKGROUND OF THE INVENTION

In electrostatic printing, a latent image is generated on the surface of a cylinder (photoconductor drum) coated with an organic photoconductor material. Toner material applied by means of a development station adheres to the latent image. The developed latent image is transferred in a subsequent step to a printed stock surface guided along the photoconductor drum. Another variant transfers the developed latent image first to an intermediate support and from it to the printed stock surface. The developed latent image is imaged on the printed stock surface because of this.

The developed image is fixed by means of a fixation process on the stock surface. Ordinary methods are then heating roll fixation, flash lamp fixation and fixation by means of a heat radiation source.

Various solution proposals of fixation devices for drying and fixation of the toner material on the stock surface have therefore been offered.

DESCRIPTION RELATIVE TO THE PRIOR ART

The European Patent Application EP 0 992 864 discloses fixation of ink on a sheet-like and/or endless support, especially toner powder on paper, in which the ink coating is heated in order to achieve melting of the toner and permanent bonding with the support. The inking is irradiated with infrared radiation, especially from an infrared lamp, at emission temperatures of 2500 K or higher, so that the ink is heated by absorption of at least part of the infrared radiation and fixed.

In unheated stock, the problem of blister formation in the toner material exists. Previous devices were therefore offered that preheat the stock, i.e., the stock is heated before the fixation process.

A shortcoming here, in the first place, is the space requirement for the additional preheater and, on the other hand, the energy loss by transport from the additional preheater to the radiation unit. Another shortcoming is that fixation of the toner material does not occur completely and sufficiently with inadequate toner material viscosity as a function of temperature.

One task of the invention is therefore to provide a fixation device and method for efficient fixation of toner material, regardless of the toner density of the toner material.

SUMMARY OF THE INVENTION

The invention discloses a fixation device for fixation of toner material for an electrophotographic printer, in which the toner material can be exposed and fixed by a radiation unit and the stock, as support of the toner material, can be heated essentially during exposure by the device. Since the stock, during exposure by the device, is heatable, the fixation device is compact, energy- and space-saving. The full range of toner densities from 10% to 400% can be appropriately fixed with the fixation device according to the invention. The toner density here refers to the density of the toner layer on the stock, which, in one-color printers, ordinarily ranges from 10% to 100%. A toner density of 400% is obtained, for example, from four toner layers of different color, each with 100% density of each toner layer.

The device can contain at least one microwave applicator for microwave radiation, through whose use the fixation process is more rapid and more economical as part of the printing process and, as a result, the entire printing process is accelerated. The energy utilization during application of a microwave applicator is high, since the microwave energy is almost exclusively used to heat the stock. This phenomenon also causes good controllability of the heating process. The radiation unit is separated from the microwave field produced by the microwave applicator by a screen.

It has turned out to be particularly advantageous for the fixation process if the toner material, during the exposure process, lies above the glass transition point of the toner material and the stock below this glass transition point, for example, with a temperature of the toner material of 110° C. and a temperature of the stock of 60° C. When this condition exists, the temperature gradient is low and the toner material maintains the temperature above the glass transition point over a relatively long period, so that advantageous effects are achieved in printing quality.

Exposure can occur with high energy density with radiation essentially in the ultraviolet spectral region. Ultraviolet radiation has the particular advantage here that it is absorbed in very high percentage by the toner material being exposed, independently of the color of the toner material, but, on the other hand, is almost completely reflected by the stock. The energy utilization is therefore higher in comparison with radiation of other frequencies.

The device can also contain a cooling device, with which a specific temperature gradient can be produced between the stock and the toner material for rapid and reliable fixation. The cooling device, during double-sided printing, further serves to avoid melting of the toner material from one side of the stock, while the toner on the other side is exposed and the stock, as described, is heated. Moreover, the stackability of the stock is guaranteed by the cooling device, since, during stacking of heated stock after application of the toner material, the printing stock sheets can stick to each other and wipe off the toner material.

For further energy utilization, the radiation unit is allocated at least one resonator, in which a microwave field is formed, and which leads to uniform homogenous distribution of the microwaves within the resonator housing and thus to uniform homogenous heating of the stock.

In a modification, additional resonators can be arranged along a transport path of the stock, so that the wave maxima of the electromagnetic fields of the individual resonators are situated essentially along the stock. The wave maxima are shifted here relative to each other by the spacing $\lambda/(2*\text{number of resonators})$. The stock is heated in the individual resonators in regions so that, after the stock has passed through all the resonators, a roughly uniform heating of the stock is performed. Thus, the stock is roughly half heated during passage through the first resonator periodically according to the wave maxima, when two resonators are used for the fixation device, and, on passage through the second resonator, the other half of the stock is heated.

BRIEF DESCRIPTION OF THE DRAWINGS

Two special variants are presented below with reference to FIGS. 1 and 2 as examples of the invention.

DETAILED DESCRIPTION OF THE PREFERRED EMBODIMENTS

Figure 1:
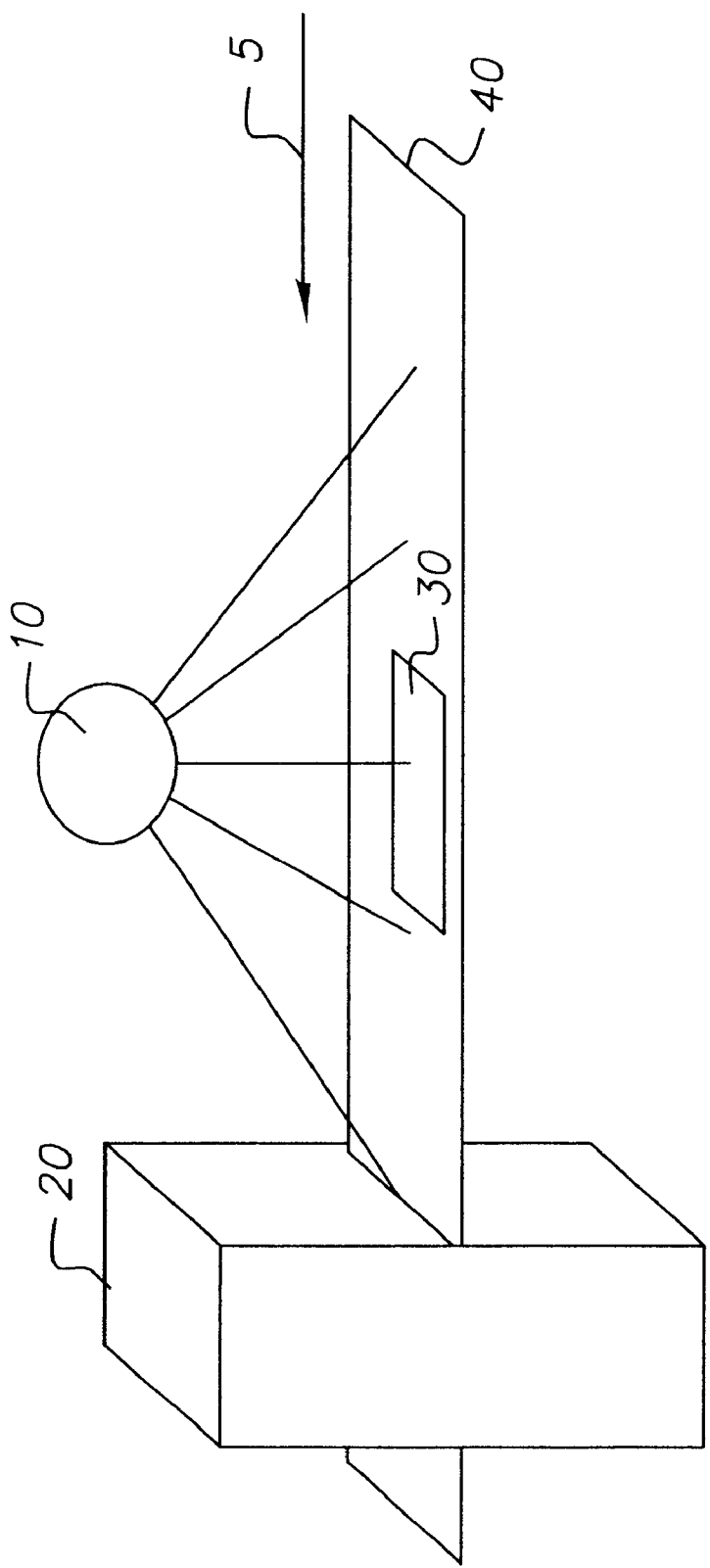
FIG. 1 shows a schematic view of part of a fixation device, with a microwave applicator and a radiation unit according to one variant of the invention.

FIG. 1 shows a schematic view of a variant of the invention, in which an endless conveyor belt 40, shown in sections here, of an electrophotographic printer (not shown) transports stock 30, in this depiction an individual sheet of paper that lies on conveyor belt 40, in the direction shown by the direction arrow. In a preceding working process, toner material was applied to stock 30 via a photoconductor drum (not shown) and additional intermediate rolls, which, in this case, determine the color values of the ultimately obtained image during multicolor printing or the gray values during single-color printing. A radiator, as part of the radiation unit 10, is arranged above conveyor belt 40, which exposes the stock 30 to radiation essentially in the ultraviolet spectral range. The radiator of the radiation unit 10 is shown laterally here and consists of an elongated tube. The ultraviolet radiation intensity, the spacing of stock 30 relative to radiation unit 10 and the wavelength of the ultraviolet radiation are chosen so that the toner material assumes a temperature above the glass transition point for a specified exposure time. Exposure causes melting and intermeshing of the toner material with the stock 30, in which the toner material, before exposure, is only held on stock 30 by weak normal forces and electrostatic forces. By intermeshing of stock 30 with the toner material after its melting, a solid, reliable and permanent bond is formed, i.e., the toner material is fixed on stock 30. Exposure of the stock 30 to ultraviolet radiation, however, cannot be suitably applied in all different types of toner material with different types of printing. In some types of melted toner material, exposure to ultraviolet radiation can undesirably have an adverse effect on the image quality by blister formation. In this example according to FIG. 1, a microwave applicator 20 is therefore arranged along conveyor belt 40. The microwave applicator 20 generates an alternating electric field that is adjusted, in terms of intensity and wavelength, to the specific application. Because of this, the molecules of the substances situated in this field are placed in motion and, by friction of the moving molecules against each other, the substrate or stock 30 is heated. Absorption of the microwave radiation is material-specific and, for paper stock 30 and the water contained in it, is at least an order of magnitude greater than for the toner material. Because of this, mostly the paper as stock 30 is heated by treatment with microwaves. It should be noted that an interaction between heating of stock 30 by the microwave applicator 20 and heating of the toner material by the radiator of the radiation unit 10 exists, as is readily understandable. Heat conduction occurs between the stock 30 and the toner material lying on it, so that the microwave applicator 20 not only heats the stock 30, but also indirectly heats the toner material above stock 30 and, on the other hand, the radiation unit 10 not only heats the toner material, but indirectly also heats the stock 30 via the toner material. This state of affairs must be considered in adjusting the aforementioned quantities to achieve specific temperatures of the employed toner material and the employed stock 30, but is rather secondary, since the microwave radiation essentially heats exclusively stock 30 and the ultraviolet radiation essentially heats exclusively the toner material. Heating of stock 30 means that the aforementioned phenomenon of blister formation in the molten toner material essentially no longer occurs and therefore an improvement of the printed image is obtained. Heated in this way during the exposure process, all ordinary toner materials can be applied by ultraviolet radiation to stock 30 with a good printing result.

Figure 2:
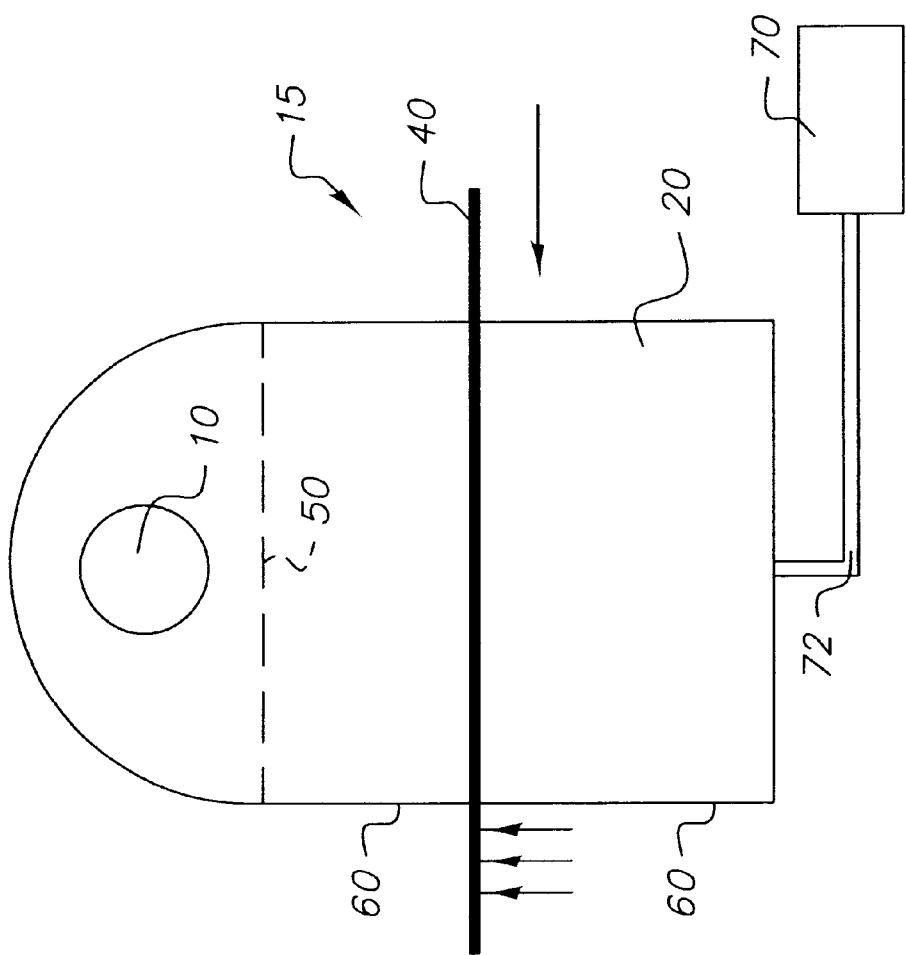
FIG. 2 shows another variant of a fixation device according to the invention, with a microwave applicator, a resonator connected to it and a conveyor belt arranged between the resonator and cooling of the conveyor belt.

FIG. 2 shows another variant of the invention, in which a radiation unit 10, with a radiator that emits essentially ultraviolet light, is arranged above a metallic screen 50 and a conveyor belt 40 of a multicolor printing machine (not shown). In this case, a situation similar to FIG. 1 is present before exposure, in which the toner material lies on stock 30 still unfixed. The conveyor belt 40 is moved in this drawing from the right to left side of FIG. 2 and extends through fixation device 15. A microwave resonator 60 is arranged beneath the metallic screen 50. The conveyor belt 40 is passed through the microwave resonator 60 and the screen forms the upper limit of the microwave resonator 60. The mesh width of screen 50 is chosen so that the electromagnetic microwave radiation of microwave source 70 remains within microwave resonator 60, with which the microwave source 70 is connected via a feed line 72. The microwave applicator 20, which contains, for example, a magnetron or klystron as microwave source 70 and the microwave resonator 60 as reactor, emits microwaves in controlled fashion and adjusted to the corresponding application, which are reflected on the walls of the microwave resonator 60 as an oscillatable system. The energy emission of the microwave applicator 20 is adjusted to different circumstances, like the dimensions of the microwave resonator 60 and the properties of stock 30 and conveyor belt 40. In this variant, the microwave applicator 20 is adjusted so that standing microwaves are generated within the housing of microwave resonator 60. By a layout of an essentially closed housing and the specific alignment of the wave maxima of the standing microwaves, in which the energy of the electric field is maximum, the applied energy can be utilized extremely well. The microwaves essentially heat printing stock 30 directly and the radiation unit 10, which essentially emits in the ultraviolet spectrum, essentially exposes the surface of stock 30 and melts the toner material applied to it. A screen that separates the microwave radiation from it is additionally arranged beneath the radiation unit 10. During roughly simultaneous application of heating by microwave source 70 and exposure by radiation unit 10, all known toner materials can be used as means of printing. A cooling device (not shown) is situated in the resonator housing, which generates a cool air stream and cools the stock 30, heated slightly by the ultraviolet radiation and essentially by the microwave radiation, after the fixation process. This process is schematically depicted by three arrows directed from the bottom up in the direction of conveyor belt 40. The cool air stream can also be directed from the top onto the conveyor belt. Cooling effectively prevents gluing together different sheets of stock 30 after the fixation process with still warm toner material, if these sheets are placed one above the other in a feeder or stacker. The cooling device also prevents the toner material of the already printed side of stock 30 in two-sided printing from melting and being released from stock 30 during or after the toner material is exposed and fixed on the other side of stock 30. As an additional solution possibility for the aforementioned case, the conveyor belt 40 can be cooled on its bottom. Facing this side, the already printed side of stock 30 is cooled directly during the exposure process, so that the already fixed toner material does not melt on this side of stock 30.

What is claimed is:

1. Fixation device (5, 15) for fixation of toner material on printing stock (30) for an electrophotographic printing machine, comprising:

a radiation unit (10), emitting radiation in an electromagnetic spectrum, at a predetermined radiation intensity for exposure of toner material on printing stock to heat the toner material to a predetermined temperature so as to be melted thermally, and at least one microwave applicator (20), having one side of the microwave applicator (20) being formed by a metal screen (50), to heat the printing stock (30), as carrier of the toner material, to a predetermined temperature, essentially during exposure.

2. Fixation device (5, 15) according to claim 1, wherein the metal screen (50) has a mesh width chosen so that no microwave radiation emerges through the metal screen (50).

3. Fixation device (5, 15) according to claim 1, wherein the emitted electromagnetic spectrum of the radiation unit (10) being essentially radiation in the ultraviolet spectral region.

4. Fixation device (5, 15) according to claim 1, wherein the temperature of the toner material during the fixation process being adjusted above the glass transition point of the toner material and the temperature of the stock (30) being adjusted below the glass transition point of the toner material.

5. Fixation device (5, 15) according to claim 1, wherein the device containing a cooling device.

6. Fixation device (5, 15) according to claim 5, wherein the cooling device being operated by air cooling, especially with formation of an air cushion beneath stock (30).

7. Fixation device (5, 15) according to claim 6, wherein the cooling device being operated by contact cooling, especially by heat transfer between a conveyor belt (40) and stock (30).

8. Fixation device (5, 15) according to claim 7, wherein the device being arranged beneath and on the opposite side of stock (30) with respect to radiation unit (10).

9. Fixation device (5, 15) according to claim 1, wherein the radiation intensity being adjustable for different applications and different types of stock.

10. Fixation device (5, 15) according to claim 9, wherein the fixation device (5, 15) having at least one microwave resonator (60), in which a standing electromagnetic microwave field is formed.

11. Fixation device (5, 15) according to claim 10, wherein the wave maxima of the microwave field in the microwave resonators (60) being shifted by specific lengths relative to each other.

12. Fixation device (5, 15) according to claim 9, wherein the fixation device having several microwave resonators (60) in sequence along a transport path of stock (30).

* * * * *